(12) United States Patent
Muroyama et al.

(10) Patent No.: US 9,606,789 B2
(45) Date of Patent: Mar. 28, 2017

(54) STORAGE DEVICE AND METHOD OF UPDATING FIRMWARE

(71) Applicant: FUJITSU LIMITED, Kawasaki-shi, Kanagawa (JP)

(72) Inventors: Tomohiko Muroyama, Yokohama (JP); Tadashi Matsumura, Kawasaki (JP); Noriyuki Yasu, Kawasaki (JP); Motoki Sotani, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 14/810,843

(22) Filed: Jul. 28, 2015

(65) Prior Publication Data
US 2016/0062761 A1 Mar. 3, 2016

(30) Foreign Application Priority Data
Sep. 3, 2014 (JP) .................................. 2014-179643

(51) Int. Cl.
*G06F 9/44* (2006.01)
*G06F 9/445* (2006.01)
(Continued)

(52) U.S. Cl.
CPC .............. *G06F 8/65* (2013.01); *G06F 9/4401* (2013.01); *H04L 67/34* (2013.01); *G06F 9/467* (2013.01)

(58) Field of Classification Search
CPC .......... G06F 8/65; G06F 9/4401; G06F 9/467; H04L 67/34
See application file for complete search history.

(56) References Cited

U.S. PATENT DOCUMENTS 8,887,144 B1 * 11/2014 Marr .................... G06F 8/65
713/2
2005/0188126 A1 8/2005 Mashima et al.
(Continued)

FOREIGN PATENT DOCUMENTS

JP 2005-242574 9/2005
JP 2008-186296 8/2008
JP 2012-194892 10/2012

OTHER PUBLICATIONS

Hilmi Berk Celikoglu, Flow-Based Freeway Travel-Time Estimation: A comparative Evaluation Within Dynamic Path Loading, 2013, pp. 772-780.*
(Continued)

*Primary Examiner* — Thuy Dao
*Assistant Examiner* — Mongbao Nguyen
(74) *Attorney, Agent, or Firm* — Staas & Halsey LLP

(57) ABSTRACT

A storage device includes first and second data transceivers connected to an upper level device through first and second paths, respectively, and a third processor. The first data transceiver includes a first processor configured to perform an access control of a first logical memory group by executing first firmware. The second data transceiver performs an access control of a second logical memory group. The third processor is configured to change, when all of logical memories included in the first logical memory group are included in the second logical memory group, recommendation levels of the first path and the second path such that a first recommendation level of the first path is lower than a second recommendation level of the second path if the first recommendation level is higher than or equal to the second recommendation level, and update the first firmware when no data is flowing through the first path.

8 Claims, 13 Drawing Sheets

(51) Int. Cl.
*H04L 29/08* (2006.01)
*G06F 9/46* (2006.01)

(56) References Cited

U.S. PATENT DOCUMENTS

| | | | | |
|---|---|---|---|---|
| 2006/0075284 A1* | 4/2006 | Skan | ............... | G06F 8/63 714/5.1 |
| 2007/0174601 A1* | 7/2007 | Douglas | ............... | G06F 8/65 713/1 |
| 2008/0120610 A1* | 5/2008 | Katano | ............... | G06F 8/65 717/168 |
| 2008/0184217 A1 | 7/2008 | Kai | | |
| 2010/0058313 A1* | 3/2010 | Hansmann | ............... | G06F 8/68 717/168 |
| 2010/0162223 A1* | 6/2010 | Hattori | ............... | G06F 8/67 717/168 |
| 2010/0318986 A1* | 12/2010 | Burke | ............... | G06F 11/3409 717/176 |
| 2014/0089912 A1* | 3/2014 | Wang | ............... | G06F 8/65 717/173 |
| 2014/0189673 A1* | 7/2014 | Stenfort | ............... | G06F 8/665 717/170 |
| 2014/0259000 A1* | 9/2014 | Desanti | ............... | G06F 8/65 717/171 |
| 2014/0366012 A1* | 12/2014 | Jamadagni | ............... | H04W 8/245 717/171 |
| 2015/0082297 A1* | 3/2015 | Parry | ............... | G06F 8/65 717/173 |
| 2016/0027516 A1* | 1/2016 | Beroset | ............... | G06F 8/665 711/103 |

OTHER PUBLICATIONS

Gheorghe Mulec, Distributed flow controller for mobile ad-hoc networks, 2013, pp. 1-4.*
Aakash S. Iyer, SwitchReduce: Reducing Switch State and Controller Involvement in OpenFlow Networks, 2013, pp. 1-9.*

* cited by examiner

FIG.2

| Access State | STATE |
|---|---|
| Active/optimized | RECOMMENDED PATHS |
| Active/non-optimized | NON-RECOMMENDED PATHS |

FIG.4

LUN Mapping Info: ~771

|  | Byte0 | Byte1 | Byte2 | Byte3 |
|---|---|---|---|---|
| 0x00 | Mapping No || (Reserved) ||
| 0x04 | CA MID | CA Port No | (Reserved) ||
| 0x08 | Friendly Name ||||
| ⋮ | |||||
| 0x14 | |||||
| 0x18 | (Reserved) ||||
| 0x1C | |||||
| 0x20 | Volume No (LUN#0) || Volume No (LUN#1) ||
| ⋮ | ⋮ ||  ⋮ ||
| 0x41C | Volume No (LUN#510) || Volume No (LUN#511) ||

| CA MID | CA PORT NO | Access State |
|---|---|---|
| 0001 | 1001 | Active/optimized |
| 0001 | 1002 | Active/optimized |
| 0002 | 2001 | Active/optimized |
| 0002 | 2002 | Active/optimized |
| 0003 | 3001 | Active/optimized |
| 0003 | 3002 | Active/optimized |
| 0004 | 4001 | Active/optimized |
| 0004 | 4002 | Active/optimized |

| CA MID | CA PORT NO | Access State |
|---|---|---|
| 0001 | 1001 | Active/optimized |
| 0001 | 1002 | Active/optimized |
| 0002 | 2001 | Active/optimized |
| 0002 | 2002 | Active/optimized |
| 0003 | 3001 | Active/non-optimized |
| 0003 | 3002 | Active/non-optimized |
| 0004 | 4001 | Active/non-optimized |
| 0004 | 4002 | Active/non-optimized |

| CA MID | CA PORT NO | Access State |
|---|---|---|
| 0001 | 1001 | Active/non-optimized |
| 0001 | 1002 | Active/non-optimized |
| 0002 | 2001 | Active/non-optimized |
| 0002 | 2002 | Active/non-optimized |
| 0003 | 3001 | Active/optimized |
| 0003 | 3002 | Active/optimized |
| 0004 | 4001 | Active/optimized |
| 0004 | 4002 | Active/optimized |

STORAGE DEVICE AND METHOD OF UPDATING FIRMWARE

CROSS-REFERENCE TO RELATED APPLICATION

This application is based upon and claims the benefit of priority from the prior Japanese Patent Application No. 2014-179643 filed on Sep. 3, 2014, the entire contents of which are incorporated herein by reference.

FIELD

The embodiments discussed herein are related to a storage device and a method of updating firmware.

BACKGROUND

Some storage devices include a plurality of modules and are connected to a host. The modules include their respective processors and operate by executing their respective independent firmware. Each of the modules is assigned with a memory area of a working plane storing firmware being currently executed and a memory area of a non-working plane storing firmware for update. The storage device includes modules such as, for example, a channel adapter (CA), a central processing unit (CPU), an input/output controller (IOC), and an expander (EXP). In the following description, firmware is also referred simply to as Firm. Firm for update is also referred to as new Firm.

When updating Firm of each module, an administrator stores a new Firm, which operates a module after the updating, in the memory area of the non-working plane assigned to the module for which the Firm is updated. Then, the administrator reboots the module for which the new Firm is stored in the memory area of the non-working plane. At the rebooting, the storage device switches between the memory area of the working plane and the memory area of the non-working plane and starts the module. Accordingly, in the storage device, the module operates with the new Firm after the rebooting. In the following description, a process of operating the module with the new Firm after the rebooting is also referred to as control to update Firm of the module.

In the storage device, the Firm of each module included in the storage device is updated without stopping a storage system. In the following description, updating Firm of each module included in the storage device without stopping the storage system is also referred to as active exchange.

A software updating device is known as another related technique. The software updating device includes a load storing means for storing load transition data associating a predicted value of load on a module with time, and update data for software to control the module. The software updating device further includes a patch storing means for storing required time taken to apply the update data to the software in association with the software. The software updating device further includes an update estimating means for extracting, from the load transition data, a time zone in which the sum of loads is below a threshold value over the required time read from the patch storing means and assigning an execution schedule of software update to the extracted time zone. Based on the execution schedule, the software updating device causes the module, for which software is updated, to stop providing of service and executes the software update.

According to a system which is known as another related technique, a first path adapter and a second path adapter of a host computer are connected to input/output ports of a first cluster and a second cluster of a storage device via a first connection path and a second connection path, respectively. The host computer is provided with an exchange path soft and a database representing destinations of the connection paths. In the storage device, the input/output ports are connected to a large number of hard disk drive devices. This storage device is provided with an internal management device and a database representing destinations of the input/output ports. A management server device is connected to the host computer and the storage device via a local area network (LAN), and is provided with a program exchange program and a microprogram used for program exchange. Instructions for starting up a program and the like are issued from a computer device.

In addition, a storage system is known as another related technique. The storage system includes a host device and a storage device including a plurality of firmware corresponding to a plurality of connection paths with the host device. The host device includes a state information notifying means for notifying state information (normal or abnormal) regarding connection paths with the storage device. The storage device includes a receiving means for receiving a state information notification corresponding to the connection paths from the host device, a management table storing state information acquired from the received state information notification, and a request receiving means for receiving an update firmware and an exchange request regarding the update firmware. The storage device further includes an exchange means. Upon receiving the exchange request, the exchange means sequentially executes, if the connection paths are all normal, active exchange for firmware corresponding to connection paths on the basis of the management table.

Related techniques are disclosed in, for example, Japanese Laid-Open Patent Publication No. 2012-194892, Japanese Laid-Open Patent Publication No. 2005-242574, and Japanese Laid-Open Patent Publication No. 2008-186296.

According to storage devices using the above-described update techniques, firmware of the CA may be actively exchanged under the multipath environment. However, an operation for active exchange for Firm may be troublesome, since an administrator switches paths for sending data and updates firmware of each CA.

SUMMARY

According to an aspect of the present invention, provided is a storage device including a first controller, a second controller, and a third processor. The first controller includes a first data transceiver connected to an upper level device through a first path. The first data transceiver includes a first processor configured to perform an access control of a first logical memory group by executing first firmware. The second controller includes a second data transceiver connected to the upper level device through a second path. The second data transceiver including a second processor configured to perform an access control of a second logical memory group by executing second firmware. The third processor is configured to change, when all of logical memories included in the first logical memory group are included in the second logical memory group, recommendation levels of the first path and the second path such that a first recommendation level of the first path is lower than a second recommendation level of the second path if the first recommendation level is higher than or equal to the second recommendation level. The third processor is configured to update the first firmware when no data is flowing through the first path.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a recommendation level;

FIG. 4 is a diagram illustrating an example of mapping information;

FIGS. 5A to 5C are diagrams illustrating an example of state information;

DESCRIPTION OF EMBODIMENTS

Hereinafter, a storage device according to an embodiment will be described.

Figure 1:
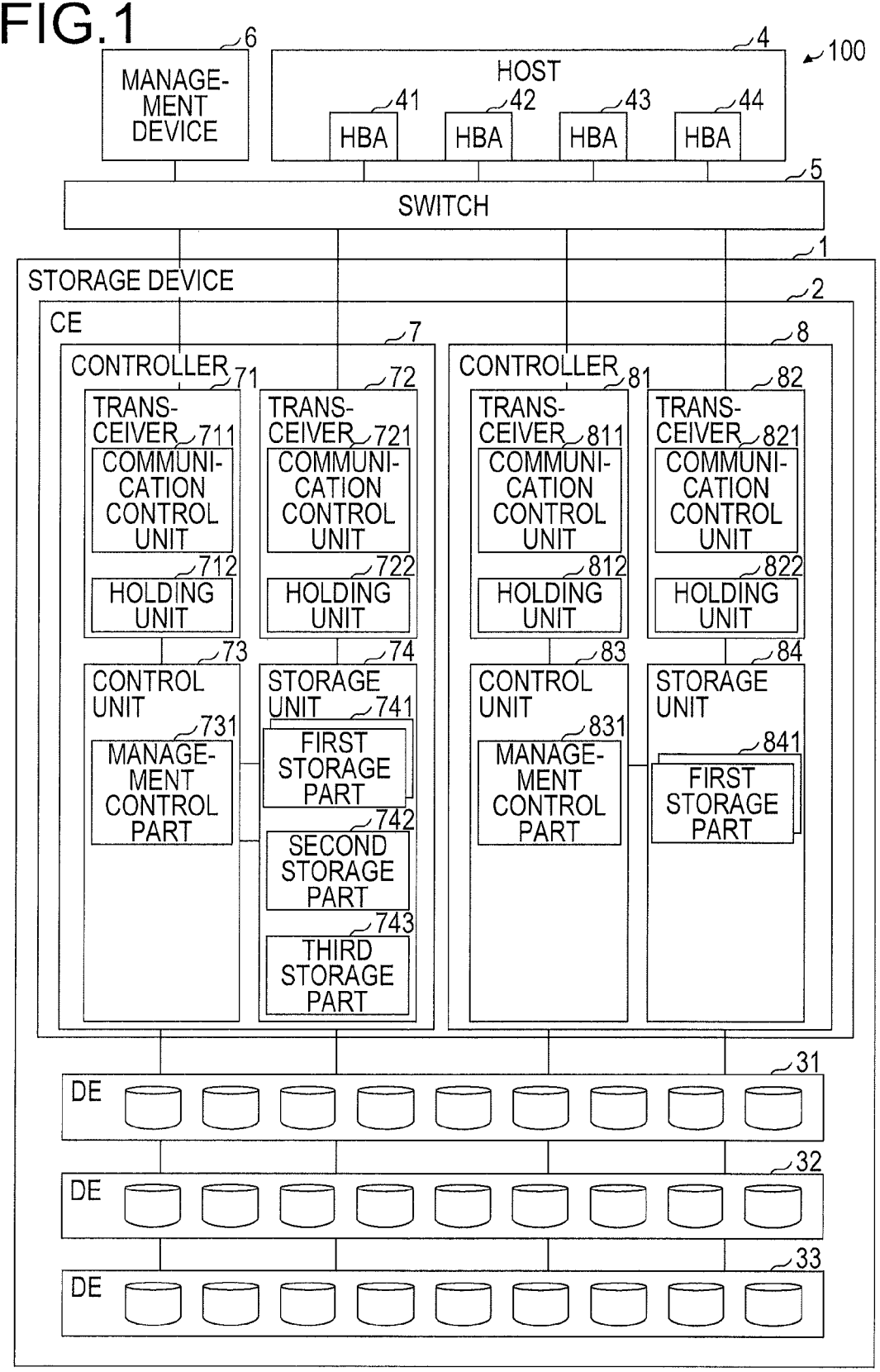
FIG. 1 is a diagram illustrating an exemplary functional configuration of a storage device.

FIG. 1 is a diagram illustrating an exemplary functional configuration of a storage device. Functions of the storage device will be described below with reference to FIG. 1. The following description will be given with update of firmware of a data transceiver (CA). A memory area storing firmware of the data transceiver has a working plane and a non-working plane in which a current Firm and a new Firm are respectively stored by an administrator.

A storage device 1 is communicably connected, via a plurality of paths, with a host 4 (upper level device) having a path selection function of selecting a path on the basis of a recommendation level to be described later. The storage device 1 is also communicably connected to a management device 6. The host 4 and the management device 6 are, for example, computer devices.

The storage device 1 is communicably connected to the host 4 and the management device 6 via, for example, a switch 5. The host 4 and the switch 5 are interconnected via, for example, host bus adapters (HBAs) 41 to 44. The switch 5 is, for example, a Fibre Channel (FC) switch. The storage device 1 may be communicably connected to the host 4 directly.

The storage device 1 includes a controller enclosure (CE) 2 and device enclosures (Des) 31 to 33. The CE 2 and disks included in the DEs 31 to 33 are communicably interconnected via, for example, a device adapter (DA) (not illustrated) included in the CE 2.

The CE 2 includes controllers 7 and 8. The controllers 7 and 8 perform access control of one or more logical memories which are preset objects to be controlled. The controller 7 (first controller) and the controller 8 (second controller) have similar functions. In the following description, the functions of the controller 7 will be described and the functions of the controller 8 similar to that of the controller 7 will not be described.

The controller 7 includes, for example, data transceivers 71 and 72, a control unit 73 and a storage unit 74. The data transceiver 71 (first data transceiver) and the data transceiver 72 (third data transceiver) have similar functions. In the following description, the functions of the data transceiver 71 will be described and the functions of data transceiver 72 similar to that of the data transceiver 71 will not be described.

The data transceiver 71 includes a communication control unit 711 (first control unit) and a holding unit 712. The data transceiver 71 is communicably connected to the switch 5 and exchanges data with the host 4 via the switch 5 through a first path. The data transceiver 71 may be directly connected to the HBAs 41 to 44 of the host 4 and directly exchange data with the host 4. The data transceiver 71, the data transceiver 72, a data transceiver 81 (second data transceiver) and a data transceiver 82 (fourth data transceiver) of the controller 8 may be communicably connected to the host 4 or may be communicably connected to other hosts (not illustrated). The data transceivers 71, 81 and 82 are connected to the host through a third path, a second path and a fourth path, respectively. In the following description, the data transceivers 71, 72, 81 and 82 are described as being connected to the host 4.

The control unit 73 includes, for example, a management control part 731. The management control part 731 is connected to modules included in the controllers 7 and 8 and exchange data with the modules.

The storage unit 74 includes first storage parts 741, a second storage part 742 and a third storage part 743. The storage unit 84 of the controller 8 includes first storage parts 841 corresponding to the first storage parts 741. This configuration of the storage unit 84 is illustrative only and the storage unit 84 may include storage parts corresponding to the second storage part 742 and the third storage part 743.

The communication control unit 711 controls the operation of the data transceiver 71 in accordance with firmware for controlling data exchange. In the following description, Firm for controlling the data exchange is also referred to as a CA Firm.

When updating the firmware, the communication control unit 711 transmits a change notification indicating that a state of the first path for exchanging data with the data transceiver 71 has been changed, in accordance with an instruction received from the management control part 731, to the host 4. The change notification is, for example, an AASC which will be described later.

If the host 4 has the function to control data exchange depending on the state of a path, the communication control unit 711 receives from the host 4 an acquisition request of the state of the path transmitted in response to the change notification. In the following description, the function to control data exchange depending on the state of a path is also referred to as a path selection function. The state of the path includes a recommendation level. For example, the host 4 uses the path selection function to select a path to exchange data on the basis of the recommendation level. The acquisition request is, for example, a REPORT TARGET PORT GROUPS (RTPG) which will be described later.

Upon receiving a communication request from the host 4 after the recommendation level of the path held in the holding unit 712 is changed, the communication control unit 711 transmits the change notification to the host 4. Accordingly, when the recommendation level of each data transceiver is changed, the host 4 acquires the recommendation level of each data transceiver and uses a path having a high recommendation level to exchange data. That is, the storage device 1 may cause the host 4 to select a path to exchange data with the storage device 1 by setting the state of a path held in each holding unit. The communication request from the host 4 is, for example, an I/O request (data) which will be described later.

When the data transceiver 71 receives the acquisition request from the host in response to the change notification, the management control part 731 determines that the host 4 has the path selection function. The phrase "the host 4 has the path selection function" indicates that the host 4 has the function to exchange data with the storage device 1 using a path with a high recommendation level. Accordingly, when the host 4 has the path selection function, the management control part 731 determines that the host 4 may select a path used for the data exchange in accordance with the recommendation level set in each path by notifying the recommendation levels set in the first to fourth paths.

If the data transceivers 71, 72, 81 and 82 are respectively connected to separate hosts, the respective communication control units 711, 721, 811 and 821 may transmit the change notification to the respective hosts in accordance with communication requests received from the respective hosts. When each data transceiver receives the acquisition request from the connected host in response to the change notification, the management control part 731 determines that each host has the path selection function. Then, the management control part 731 determines that the host may select a path used for the data exchange in accordance with the recommendation level set in each path by notifying the recommendation levels set in the first to fourth paths to each host.

For example, if the host 4 supports a Target Port Group Support (TPGS) protocol, the path selection function is equipped in the host 4. In the following description, the storage device 1 and the host 4 are described as using the TPGS protocol, as an example, when performing the path selection function. However, the path selection function may be implemented with other protocols to achieve a similar operation, instead of the TPGS protocol.

When the host 4 has the path selection function, the host 4 exchanges data using a path having a high recommendation level. For example, when the storage device 1 and the host 4 support the TPGS protocol, the recommendation level is set as a table 201 illustrated in FIG. 2.

"Access State" in the table 201 illustrated in FIG. 2 indicates the state of a path interconnecting the storage device 1 and the host 4. For example, when the state of the first path to exchange data with the data transceiver 71 is "Active/optimized", the host 4 determines that the state of the first path is a recommended path (a path having a high recommendation level) for which high performance is expected. When the state of the first path is "Active/non-optimized", the host 4 determines that the state of the first path is a non-recommended path (a path having a low recommendation level).

The holding unit 712 holds the state of the first path connected to the data transceiver 71 in accordance with an instruction received from the management control part 731. Accordingly, upon receiving the acquisition request for path state from the host 4, the communication control unit 711 transmits the state of the first path held in the holding unit 712 to the host 4. The state of the first path includes the recommendation level of the first path.

The holding units 722, 812 and 822 of the data transceivers 72, 81 and 82 hold the states of the third path, the second path and the fourth path connected to the data transceivers 72, 81 and 82, respectively, in accordance with an instruction received from the management control part 731. Upon respectively receiving the acquisition requests for the states of the paths from the host 4, the communication control units 721, 811 and 821 transmit the states of the third path, the second path and the fourth path held in the respective holding units 722, 812 and 822 to the host 4. The states of the third path, the second path and the fourth path include recommendation levels of the third path, the second path and the fourth path, respectively.

In multipath environment, upon acquiring recommendation levels as the states of the first to fourth paths, the host 4 uses a path having a high recommendation level to exchange data. For example, when a multipath is formed between the first path and the second path, the host 4 uses the second path to exchange data if the recommendation level of the first path is lower than the recommendation level of the second path.

The holding units 712, 722, 812 and 822 hold identification information indicating logical memories assigned for the data transceivers 71, 72, 81 and 82, respectively, and constituted by disks included in the DEs 31 to 33, in accordance with an instruction received from the management control part 731. When communication connections of the respective communication control units with the host 4 are initiated, the respective communication control units inform the host 4 of the identification information of the logical memories assigned for the respective data transceivers. Accordingly, the storage device 1 informs the host 4 of states of assignment of the logical memories to the respective data transceivers. The identification information of the logical memory is, for example, a logical unit number (LUN).

When updating firmware used for the control of the data transceiver 71, the management control part 731 determines whether or not the data transceiver 71 and one or more of the data transceivers 81 and 82 may accept an access (accessible) to the same logical memory. In addition, the management control part 731 determines whether or not the data transceiver 72 and one or more of the data transceivers 81 and 82 are accessible to the same logical memory. In the following description, it is assumed that the data transceiver 71 and the data transceiver 81 are accessible to the same logical memory. It is also assumed that the data transceiver 72 and the data transceiver 82 are accessible to the same logical memory. In the following description, an active exchange for the firmware of the data transceiver 71 will be described. However, the storage device 1 may perform an active exchange for the firmware of the data transceivers 72, 81 and 82 in a similar way.

For example, when the same logical memory is assigned for the data transceiver 71 and the data transceiver 72, and another same logical memory is assigned for the data transceiver 72 and the data transceiver 82, the management control part 731 determines that the storage device 1 and the host 4 are interconnected under the multipath environment.

In the following description, the multipath indicates that the host 4 and each logical memory built in the storage device 1 are interconnected by two or more paths through separate controllers. If a plurality of hosts are connected to the storage device 1, it is indicated that each logical memory of the storage device 1 and a host connected to the logical memory are communicably interconnected by two or more paths through separate controllers.

When updating the firmware to control the operation of the data transceivers 71, 72, 81 and 82, the management control part 731 performs the following process if the storage device 1 and the host 4 are interconnected under the multipath environment.

When updating the firmware of the data transceiver 71, the management control part 731 determines that the storage device 1 and the host 4 are interconnected under the multipath environment using the first path set in the data transceiver 71 and the second path set in the data transceiver 81. Then, the management control part 731 sets the recommendation level of the first path to be lower than the recommendation level of the second path.

In addition, when updating the firmware of the data transceiver 71, the management control part 731 determines that the storage device 1 and the host 4 are interconnected under the multipath environment using the third path set in the data transceiver 72 and the fourth path set in the data transceiver 82. The management control part 731 sets the recommendation level of the third path to be lower than the recommendation level of the fourth path.

For example, if the recommendation level of the first path is set to be higher than the recommendation level of the second path, the management control part 731 sets the recommendation level of the first path to be lower than the recommendation level of the second path. For example, if the recommendation level of the first path is set to be lower than the recommendation level of the second path, the management control part 731 may maintain the recommendation level of the first path and the recommendation level of the second path.

For example, if the recommendation level of the third path is set to be higher than the recommendation level of the fourth path, the management control part 731 sets the recommendation level of the third path to be lower than the recommendation level of the fourth path. For example, if the recommendation level of the third path is set to be lower than the recommendation level of the fourth path, the management control part 731 may maintain the recommendation level of the third path and the recommendation level of the fourth path.

At this time, for example, the management control part 731 holds "Active/non-optimized" in the holding units 712 and 722 of the data transceivers 71 and 72. The management control part 731 also holds "Active/optimized" in the holding units 812 and 822 of the data transceivers 81 and 82.

The management control part 731 determines whether or not no data is flowing through the paths interconnecting the host 4 and the controller 7 as a result of that each communication control unit informs the host 4 of the recommendation level of each data transceiver and the host 4 selects a path having a high recommendation level and transmits data. If no data is flowing through the paths interconnecting the host 4 and the controller 7, the management control part 731 performs the control to update the firmware of the data transceiver 71 included in the controller 7. Accordingly, the storage device 1 may actively exchange the firmware of the data transceiver 71 included in the controller 7 while maintaining the storage device 1 in the state of online with the host 4. At this time, the management control part 731 may update the firmware of the data transceiver 72. Accordingly, the storage device 1 may actively exchange the firmware of the data transceiver 72 while maintaining the storage device 1 in the state of online with the host 4.

When the active exchange for the firmware of the data transceiver 71 is completed, the management control part 731 sets the recommendation level of the second path set in the data transceiver 81 to be lower than the recommendation level of the first path set in the data transceiver 71. The management control part 731 also sets the recommendation level of the fourth path set in the data transceiver 82 to be lower than the recommendation level of the third path set in the data transceiver 72 included in the controller 7. At this time, for example, the management control part 731 holds "Active/optimized" in the holding units 712 and 722 of the data transceivers 71 and 72. The management control part 731 also holds "Active/non-optimized" in the holding units 812 and 822 of the data transceivers 81 and 82.

The management control part 731 determines whether or not no data is flowing through the paths interconnecting the host 4 and the controller 8 as a result of that each communication control unit informs the host 4 of the recommendation level of each data transceiver and the host 4 selects a path having a high recommendation level and transmits data. If no data is flowing through the paths interconnecting the host 4 and the controller 8, the management control part 731 performs the control to update the firmware of the data transceiver 81 included in the controller 8. Accordingly, the storage device 1 may actively exchange the firmware of the data transceiver 81 included in the controller 8, while maintaining the storage device 1 in the state of online with the host 4. At this time, the management control part 731 may update the firmware of the data transceiver 82. Accordingly, the storage device 1 may actively exchange the firmware of the data transceiver 82 while maintaining the storage device 1 in the state of online with the host 4.

Figure 3:
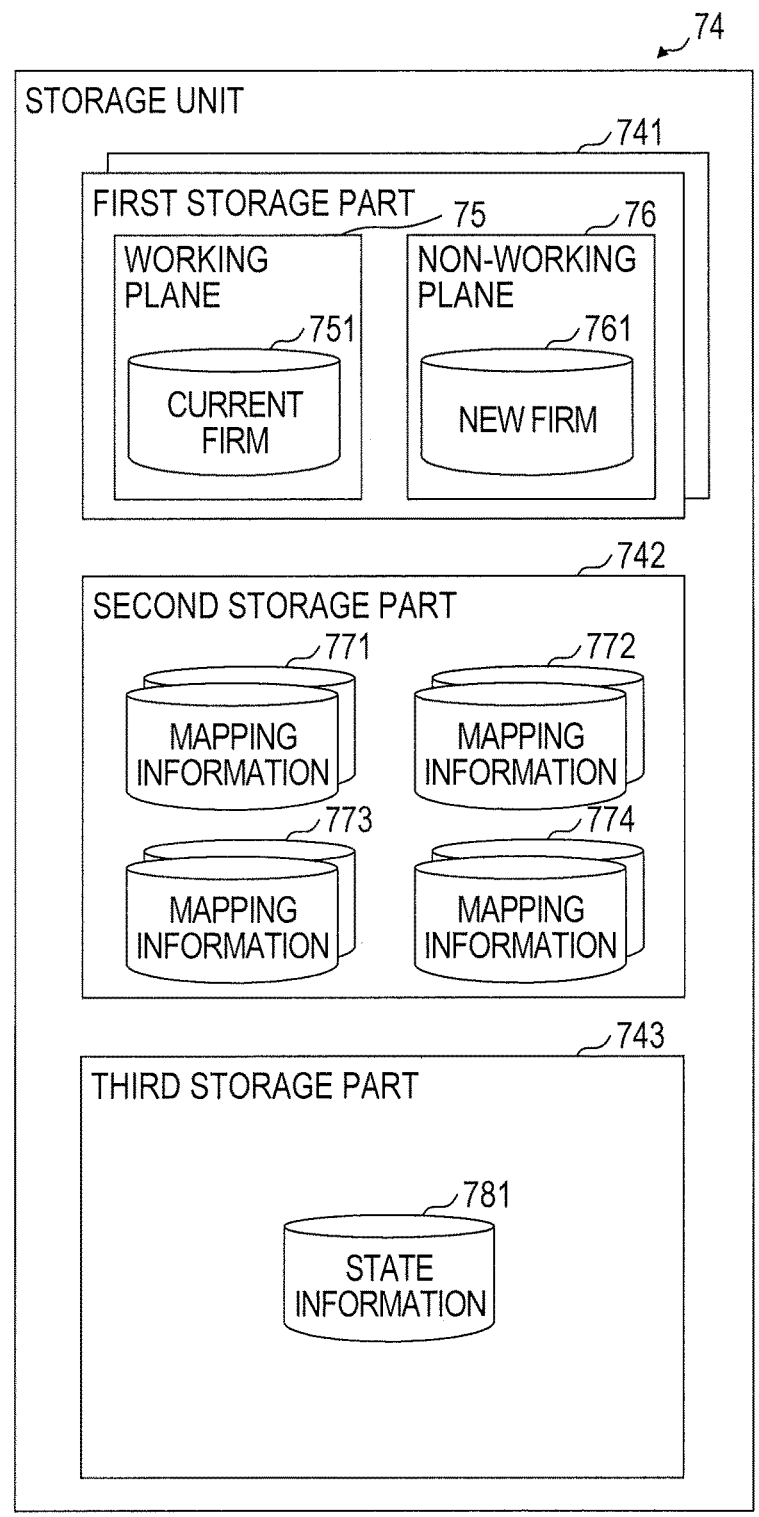
FIG. 3 is a diagram illustrating information stored in a storage unit.

FIG. 3 is a diagram illustrating information stored in a storage unit. The information stored in the storage unit 74 will be described below with reference to FIG. 3.

The storage unit 74 includes the first storage parts 741, the second storage part 742 and the third storage part 743.

The number of the first storage parts 741 is equal to the number of the data transceivers included in the controller 7, and each of the first storage parts 741 has a working plane 75 and a non-working plane 76. A current Firm 751 is stored in the working plane 75 by an administrator through the management device 6. A new Firm 761 is stored in the non-working plane 76 by the administrator through the management device 6. For example, when the same firmware is applied to the data transceivers included in the controller 7, the storage unit 74 may include one set of first storage parts 741 shared by the data transceivers.

For example, the current Firm 751 is currently deployed in the holding unit of the data transceiver in accordance with an instruction received from the management control part 731 and causes the communication control unit to control the data transceivers. For example, in the control to update the firmware, the new Firm 761 is exchanged with the current Firm 751 at the rebooting, in accordance with an instruction received from the management control part 731, is deployed in the holding unit, and causes the communication control unit to control the data transceivers after the updating.

For example, mapping information related to an accessible logical memory assigned for each data transceiver included in CE 2 is stored in the second storage part 742 by the administrator through the management device 6. For example, the storage device 1 stores mapping information 771, 773, 772 and 774 corresponding respectively to the data transceivers 71, 72, 81 and 82 in the storage unit 74.

Each of the mapping information includes identification information of the logical memory assigned for a corresponding data transceiver. The management control part 731 searches for the identification information of each logical memory of the storage device 1 by referring to the mapping information. When the identification information of each logical memory is assigned for one or more data transceivers included in the controller 7 and is assigned for one or more data transceivers included in the controller 8, the management control part 731 determines that the storage device 1 and the host 4 are interconnected under the multipath environment. In this manner, since two paths between the logical memory and the host 4 are prepared under the multipath environment, even when one of the controllers 7 and 8 is turned off, the other controller may be used to maintain communication connection between the logical memory and the host 4. Accordingly, when updating the firmware, the management control part 731 may achieve an active exchange for the firmware by alternately rebooting the controller 7 and the controller 8.

FIG. 4 is a diagram illustrating an example of the mapping information. A record 0x04 includes a CA MID indicating the identification information of the data transceiver 71 and a CA Port No indicating the identification information of a port of the data transceiver 71.

Records 0x20 to 0x41C include Volume No indicating the logical memory assigned for the data transceiver 71.

The reference will be made to FIG. 3. State information 781 is stored in the third storage part 743. The state information 781 is stored for a path connected to each of ports included in the data transceivers, for example, as illustrated in FIGS. 5A to 5C. As an example, the state information 781 illustrated in FIGS. 5A to 5C indicates information when each of the data transceivers included in the storage device 1 has two ports. CA MID0001 indicates, for example, the data transceiver 71. CA MID0002 indicates, for example, the data transceiver 72. CA MID0003 indicates, for example, the data transceiver 81. CA MID0004 indicates, for example, the data transceiver 82.

The state information 781 illustrated in FIG. 5A indicates a state where the all paths connected to ports of the storage device 1 are set to have a high recommendation. At this time, the storage device 1 and the host 4 use all the paths connected to ports of the storage device 1 for data exchange. The state information 781 illustrated in FIG. 5A indicates a state set when the storage device 1 and the host 4 exchange data.

The state information 781 illustrated in FIG. 5B indicates a state where all paths connected to ports of the controller 7 are set to have a high recommendation and all paths connected to ports of the controller 8 are set to have a low recommendation. At this time, the storage device 1 and the host 4 use the all paths connected to ports of the controller 7 for data exchange. The state information 781 illustrated in FIG. 5B indicates a state set when paths to exchange data are biased to the paths connected to the controller 7 when the firmware is actively exchanged by the management control part 731. Biasing the paths refers to using either one of a path group connected to the controller 7 and a path group connected to the controller 8 to perform data exchange between the storage device 1 and the host 4.

The state information 781 illustrated in FIG. 5C indicates a state where all paths connected to ports of the controller 7 is set to have a low recommendation and all paths connected to ports of the controller 8 is set to have a high recommendation. At this time, the storage device 1 and the host 4 use the all paths connected to ports of the controller 8 for data exchange. The state information 781 illustrated in FIG. 5C indicates a state set when paths to exchange data are biased to the paths connected to the controller 8 when the firmware is actively exchanged by the management control part 731.

Figure 6:
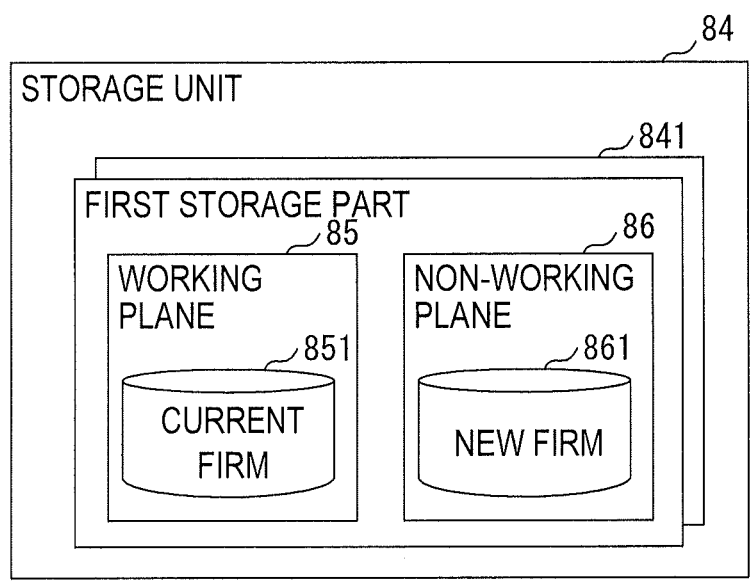
FIG. 6 is a diagram illustrating information stored in a storage unit.

FIG. 6 is a diagram illustrating information stored in a storage unit. The information stored in the storage unit 84 will be described below with reference to the storage unit.

The storage unit 84 includes the first storage parts 841. The number of the first storage parts 841 is equal to the number of data transceivers included in the controller 8, and each of the first storage parts 841 has a working plane 85 and a non-working plane 86. A current Firm 851 is stored in the working plane 85 by an administrator through the management device 6. A new Firm 861 is stored in the non-working plane 86 by the administrator through the management device 6. For example, when the same firmware is applied to the data transceivers included in the controller 8, the storage unit 84 may include one set of first storage parts 841 shared by the data transceivers.

For example, the current Firm 851 is currently deployed in the holding unit of the data transceiver in accordance with an instruction received from the management control part 731 and causes the communication control unit to control the data transceivers. For example, in the control to update the firmware, the new Firm 861 is exchanged with the current Firm 851 at the rebooting, in accordance with an instruction received from the management control part 731, is deployed in the holding unit, and causes the communication control unit to control the data transceivers after the updating.

Figure 7:
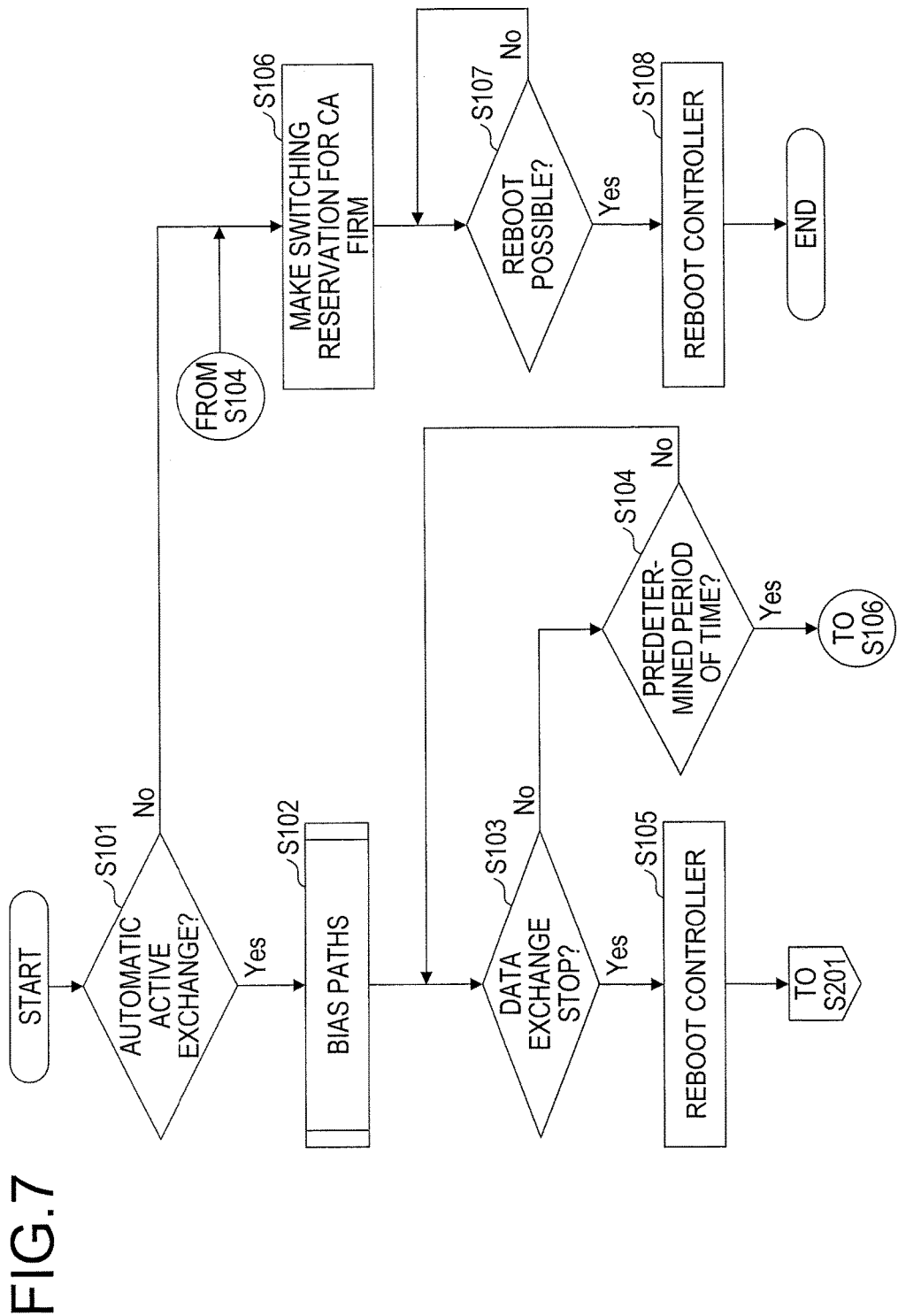
FIG. 7 is a flowchart illustrating an active exchange process.
Figure 8:
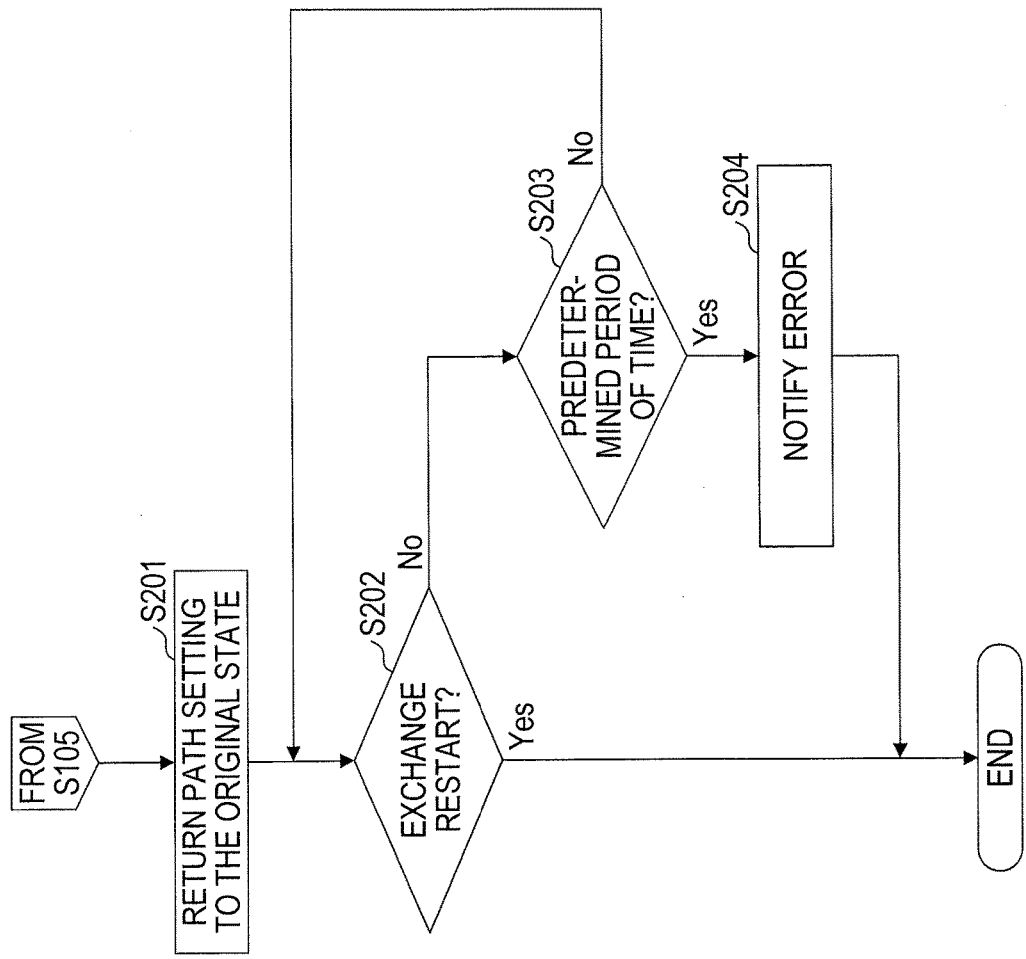
FIG. 8 is a flowchart illustrating an active exchange process.

FIGS. 7 and 8 are flowcharts illustrating an active exchange process. The following description will be made with reference to the storage device 1 illustrated in FIG. 1. It is assumed that the path selection function is performed based on the TPGS protocol. That is, if the host 4 does not support the TPGS protocol, it is assumed that the host 4 has no function to exchange data using a path having a high recommendation level. At this time, paths are not biased only by the management control part 731 to change a path state. Accordingly, it is determined that the management control part 731 does not achieve automatic active exchange for the CA Firm even under the multipath environment.

The CA Firm is input from the management device 6 in accordance with a manipulation by the administrator and a new Firm is written in a non-working plane. Upon receiving an instruction for active exchange for the CA Firm, the management control part 731 determines whether or not the CA Firm is actively exchanged automatically (S101).

Figure 9:
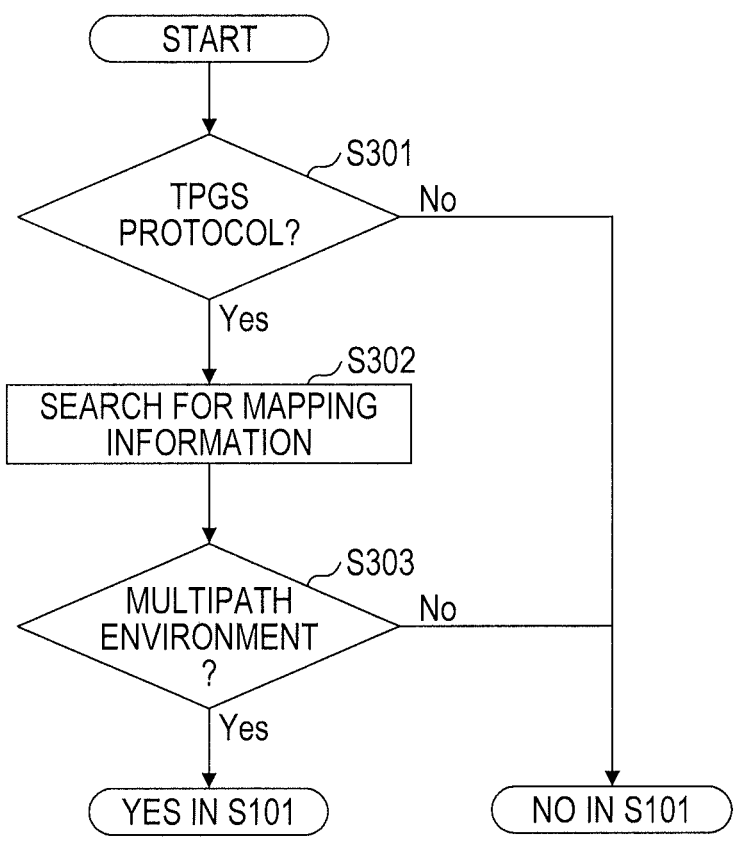
FIG. 9 is a flowchart illustrating a process of determining whether or not CA Firm is actively exchanged automatically.

FIG. 9 is a flowchart illustrating a process of determining whether or not the CA Firm is actively exchanged automatically.

The process of determining whether or not the CA Firm is actively exchanged automatically will be described below with reference to FIG. 9.

The management control part 731 determines whether or not the host 4 supports the TPGS protocol (S301).

Figure 10:
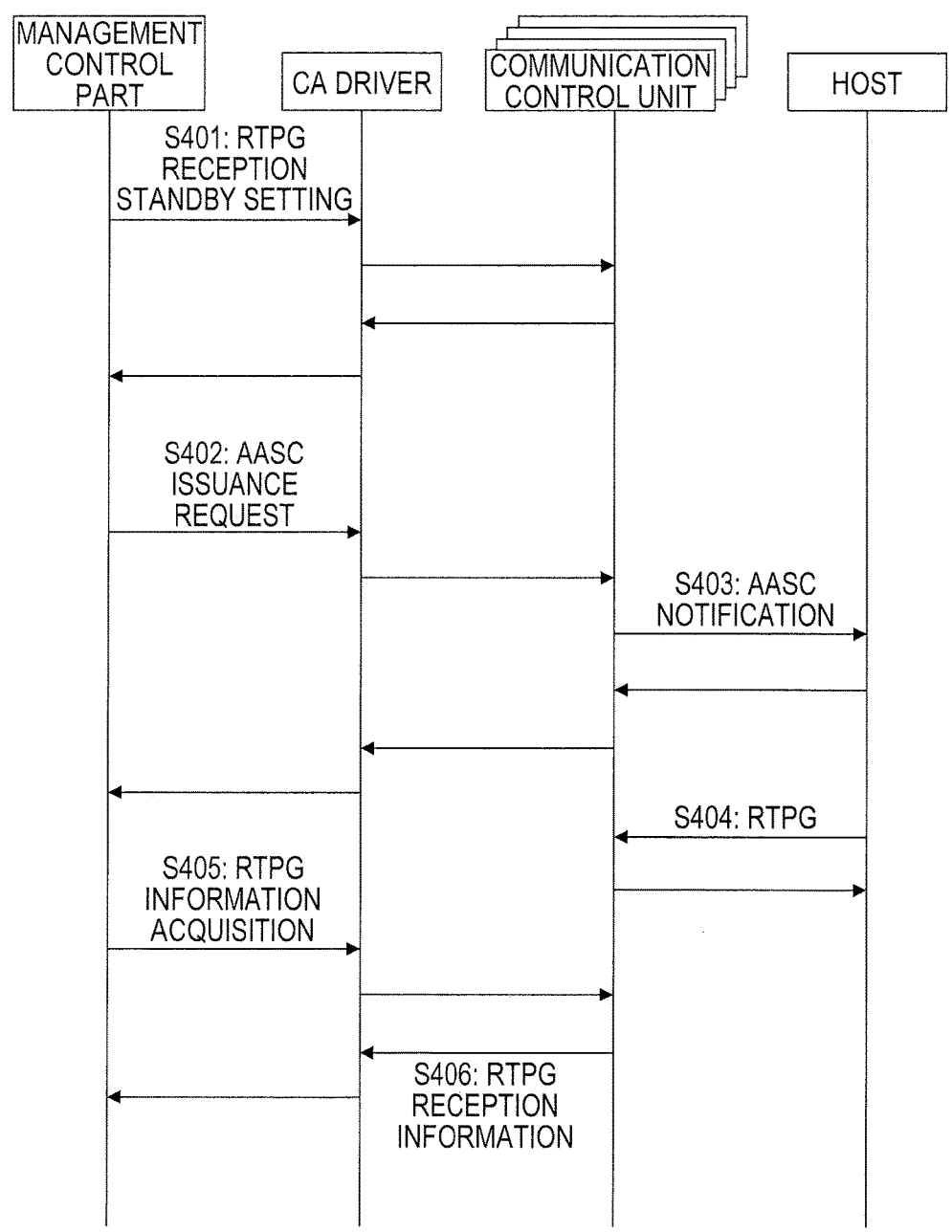
FIG. 10 is a sequence diagram illustrating a process of determining whether or not a host supports a TPGS protocol.

FIG. 10 is a sequence diagram illustrating a process of determining whether or not the host supports the TPGS protocol.

The process of determining whether or not the host supports the TPGS protocol will be described below with reference to FIG. 10.

The management control part 731 sets an RTPG (acquisition request) reception standby in each communication control unit through a CA driver (S401). Accordingly, each communication control unit may receive the RTPG from the host 4. Each communication control unit informs the management control part of the fact that the RTPG reception standby is set. The CA driver is a driver for the management control part 731 to control the communication control unit.

When the RTPG reception standby is set in each communication control unit, the management control part 731 sends an issuance request for an ASYMMETRIC ACCESS STATE CHANGE (AASC), which is a change notification, to each communication control unit through the CA driver (S402).

Upon receiving the AASC issuance request from the management control part 731, each communication control unit issues an AASC and informs the host 4 of the AASC via each path connected to each of the ports of the data transceivers (S403). Then, the host 4 informs the management control part 731 of the fact that the host 4 is informed of the AASC, through the communication control unit and the CA driver.

If the host 4 supports the TPGS protocol, the host 4 sends an RTPG (acquisition request) to each communication control unit (S404). Upon receiving the RTPG, each communication control unit sends the host 4 a path state held in the holding unit included in the same data transceiver. Thus, the host 4 may recognize states of the first to fourth paths including recommendation levels.

After sending the AASC issuance request in S402, the management control part 731 periodically inquires whether or not the communication control unit has received an RTPG (S405).

Upon receiving from the management control part 731 the inquiry about whether the RTPG has been received after receiving the RTPG from the host 4, each communication control unit sends the management control part 731 the information indicating that the RTPG has been received (S406).

Upon receiving the information indicating that the RTPG has been received in each communication control part, the management control part 731 determines that the host 4 supports the TPGS protocol. On the other hand, if the information indicating that the RTPG has been received in each communication control unit is not received for a certain period of time after sending the AASC issuance request in S402, the management control part 731 determines that the host 4 does not support the TPGS protocol.

Receiving by the management control part 731 the information indicating that the RTPG has been received in each communication control unit is to determine whether or not all hosts connected to the storage device 1 support the TPGS protocol when a data transceiver included in the storage device 1 is connected to separate hosts. If all of the hosts connected to the storage device 1 support the TPGS protocol, the management control part 731 determines that the paths in the storage device 1 may be biased.

Referring back to FIG. 9, if it is determined that the host 4 does not support the TPGS protocol (No in S301), the management control part 731 determines that the CA Firm is not actively exchanged automatically (No in S101), and then performs S106.

If it is determined that the host 4 supports the TPGS protocol (Yes in S301), the management control part 731 searches for mapping information of all data transceivers included in the storage device 1 (S302).

The management control part 731 determines whether or not all logical memories are connected to the host 4 under the multipath environment (S303).

If the identification information of each logical memory is assigned for one or more data transceivers included in the controller 7 or one or more data transceivers included in the controller 8, the management control part 731 determines that each logical memory is not connected to the host 4 under the multipath environment (No in S303). Then, the management control part 731 determines that the CA Firm is not actively exchanged automatically (No in S101) and then performs S106.

If the identification information of each logical memory is assigned for one or more data transceivers included in the controller 7 and for one or more data transceivers included in the controller 8, the management control part 731 determines that all logical memories are connected to the host 4 under the multipath environment (Yes in S303). Then, the management control part 731 performs S102.

Referring back to FIG. 7, if it is determined that the CA Firm is not actively exchanged automatically (No in S101), the management control part 731 makes switching reservation for a CA Firm (S106).

Then, the management control part 731 waits until rebooting of a controller becomes possible (No in S107).

When the rebooting of the controller becomes possible (Yes in S107), the management control part 731 switches the CA Firm of a data transceiver included in the controller to a new Firm and reboots the controller (S108). Thus, the management control part 731 may update the CA Firm of the data transceiver included in each controller if each controller may be rebooted. For example, when a controller is restarted by the administrator, the controller may be rebooted.

If it is determined that the CA is actively exchanged automatically (Yes in S101), the management control part 731 biases paths to exchange data (S102).

Figure 11:
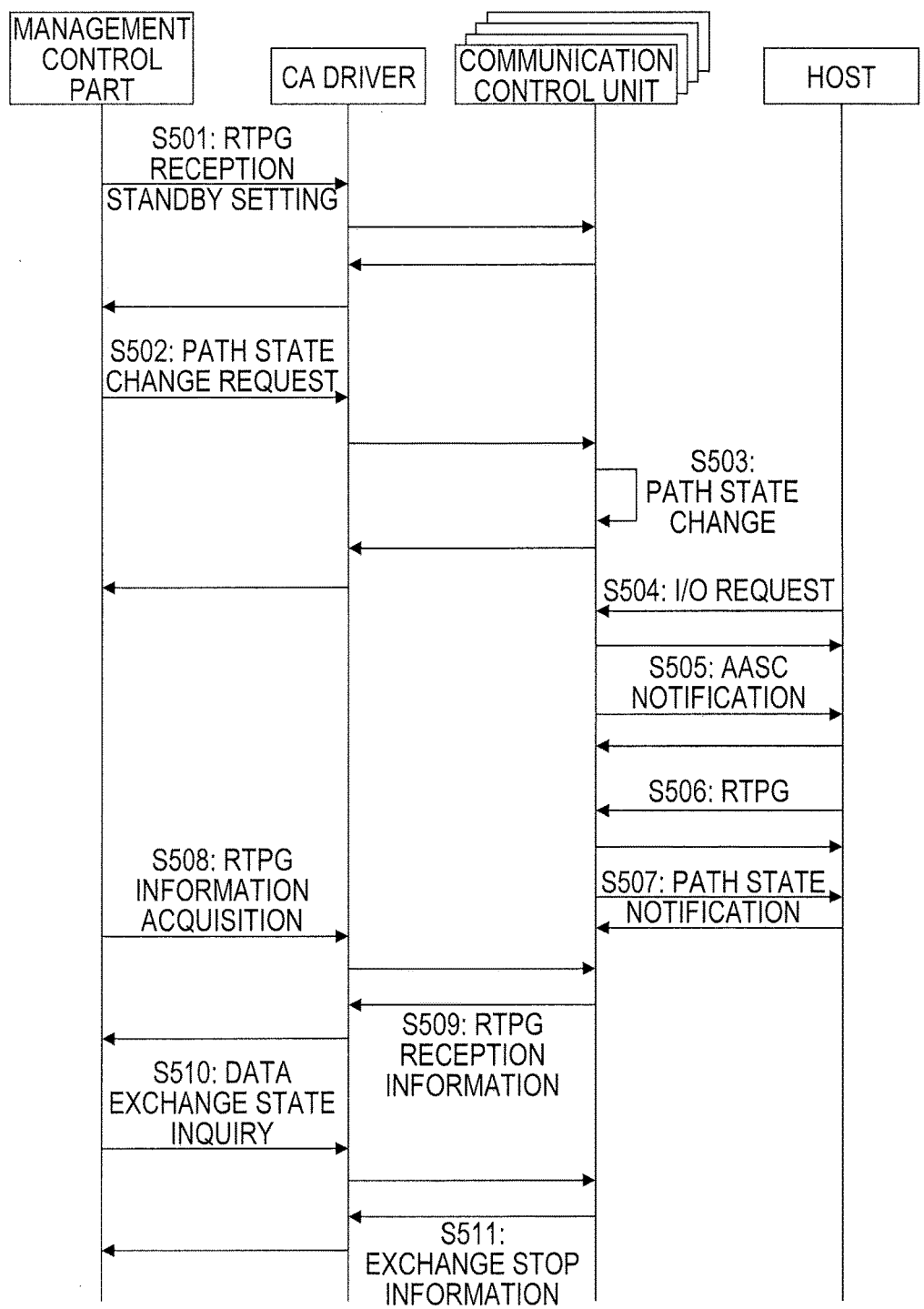
FIG. 11 is a sequence diagram illustrating a process of biasing paths to exchange data.

FIG. 11 is a sequence diagram illustrating a process of biasing paths to exchange data. The process of biasing paths to exchange data will be described below with reference to FIG. 11.

The management control part 731 sets reception standby of an RTPG (acquisition request) in each communication control unit through a CA driver (S501). Accordingly, each communication control unit may receive an RTPG from the host 4. Then, each communication control unit informs the management control part 731 of the fact that the RTPG reception standby is set.

The management control part 731 sends each communication control unit a change request for a path state through the CA driver (S502). At this time, the management control part 731 sets a recommendation level of a path connected to the controller 7 to be lower than a recommendation level of a path connected to the controller 8, as illustrated in FIG. 5C. Then, the management control part 731 sends the set recommendation level to each communication control unit.

Upon receiving the change request for the path state, each communication control unit holds the recommendation level, which is received from the management control part 731, in the holding unit belonging to the same data transceiver (S503). Then, each communication control unit informs the management control part 731 of the fact that the path state is changed, through the CA driver.

Upon receiving an I/O request from the host 4 (S504), each communication control unit informs the host 4 of the fact that the I/O request is received. Then, each communication control unit issues an AASC (change notification) and sends the host 4 the AASC via each path connected to each port of the data transceiver (S505).

Upon receiving the AASC, the host 4 informs each communication control unit of the fact that the AASC is received. The host 4 determines that the state of each communication has been changed, and inquires about the state of each communication control unit by sending RTPG to each communication control unit (S506).

Upon receiving the RTPG, each communication control unit informs the host 4 of the fact that the RTPG is received. Then, each communication control unit sends the host 4 the path state held in the holding unit included in the same data transceiver (S507). Thus, the host 4 may recognize the states of the first to fourth paths by receiving the path state from each communication control unit. Upon receiving the path state, the host 4 informs each communication control unit of the fact that the path state is received.

After sending the change request for the path state in S502, the management control part 731 periodically inquires whether or not each communication control unit has received an RTPG (S508).

Upon receiving from the management control part 731 the inquiry about whether the RTPG has been received after receiving the RTPG from the host 4, each communication control unit sends the management control part 731 the information indicating that the RTPG has been received (S509).

Upon receiving from each communication control unit the information indicating that the RTPG is received, the management control part 731 determines that the host 4 has recognized the path state, and inquires a data exchange state of each communication control unit (S510).

Upon receiving the fact that the data exchange with the host 4 is stopped, from a communication control unit included in a data transceiver connected to a path set with a low recommendation level within a predetermined period of time (S511), the management control part 731 determines that the process of biasing data has been completed.

Referring back to FIG. 7, after performing the process of biasing the paths to exchange data in S102, the management control part 731 determines whether or not the data exchange between the host 4 and each communication control unit has been stopped (S103). If the data exchange between the host 4 and each communication control unit has not been stopped, the management control part 731 determines whether or not a predetermined period of time elapses (S104).

If the predetermined period of time does not elapse (No in S104), the management control part 731 performs S103. If the predetermined period of time elapses (Yes in S104), the management control part 731 determines that the data biasing has not been completed, and performs S106.

If the data exchange between the host 4 and each communication control unit has been stopped (Yes in S103), the management control part 731 reboots a controller whose data reception from the host 4 is stopped (S105). At the rebooting, the management control part 731 switches the CA Firm of the data transceiver included in the controller from the current Firm to the new Firm.

For example, after updating the CA Firm of the data transceivers included in the controller 7 and when updating the CA Firm of the data transceivers included in the controller 8, the management control part 731 may repeat S102 to S105. That is, for example, the management control part 731 first sets a recommendation level of a path connected to the controller 7 to be lower than a recommendation level of a path connected to the controller 8. Then, when the data exchange between the host 4 and the controller 7 is stopped, the management control part 731 may actively exchange the CA Firm by rebooting the controller 7. Subsequently, for example, the management control part 731 sets the recommendation level of the path connected to the controller 8 to be lower than the recommendation level of the path connected to the controller 7. Then, when the data exchange between the host 4 and the controller 8 is stopped, the management control part 731 may actively exchange the CA Firm by rebooting the controller 8.

Referring back to FIG. 8, after actively exchanging the CA Firm, the management control part 731 returns the setting of the paths to exchange data with the host 4 to the original state (S201). At this time, for example, the management control part 731 may set high recommendation levels for the paths connected to the controllers 7 and 8, as illustrated in FIG. 5A. Then, the management control part 731 sends the set recommendation levels to each communication control unit. Each communication control unit receives the recommendation level and holds the received recommendation level in the holding unit. When the recommendation level of the path held in the holding unit is changed, each communication control unit sends an AASC to the host 4 and performs a series of processes of informing the host 4 of the recommendation level.

The management control part 731 determines whether or not the controller whose data exchange with the host 4 has been stopped restarts a data exchange with the host 4 (S202).

When restating the data exchange with the host 4 (Yes in S202), the management control part 731 ends the active exchange process.

If the data exchange with the host 4 is not restarted (No in S202), the management control part 731 determines whether or not a predetermined period of time elapses (S203). If the predetermined period of time does not elapse (No in S203), the management control part 731 performs S202.

If the predetermined period of time elapses (Yes in S203), the management control part 731 determines that the communication state between the storage device 1 and the host 4 is not returned to the state before the active exchange, and informs the management device 6 of an error (S204). Then, the management control part 731 ends the active exchange process.

Figure 12:
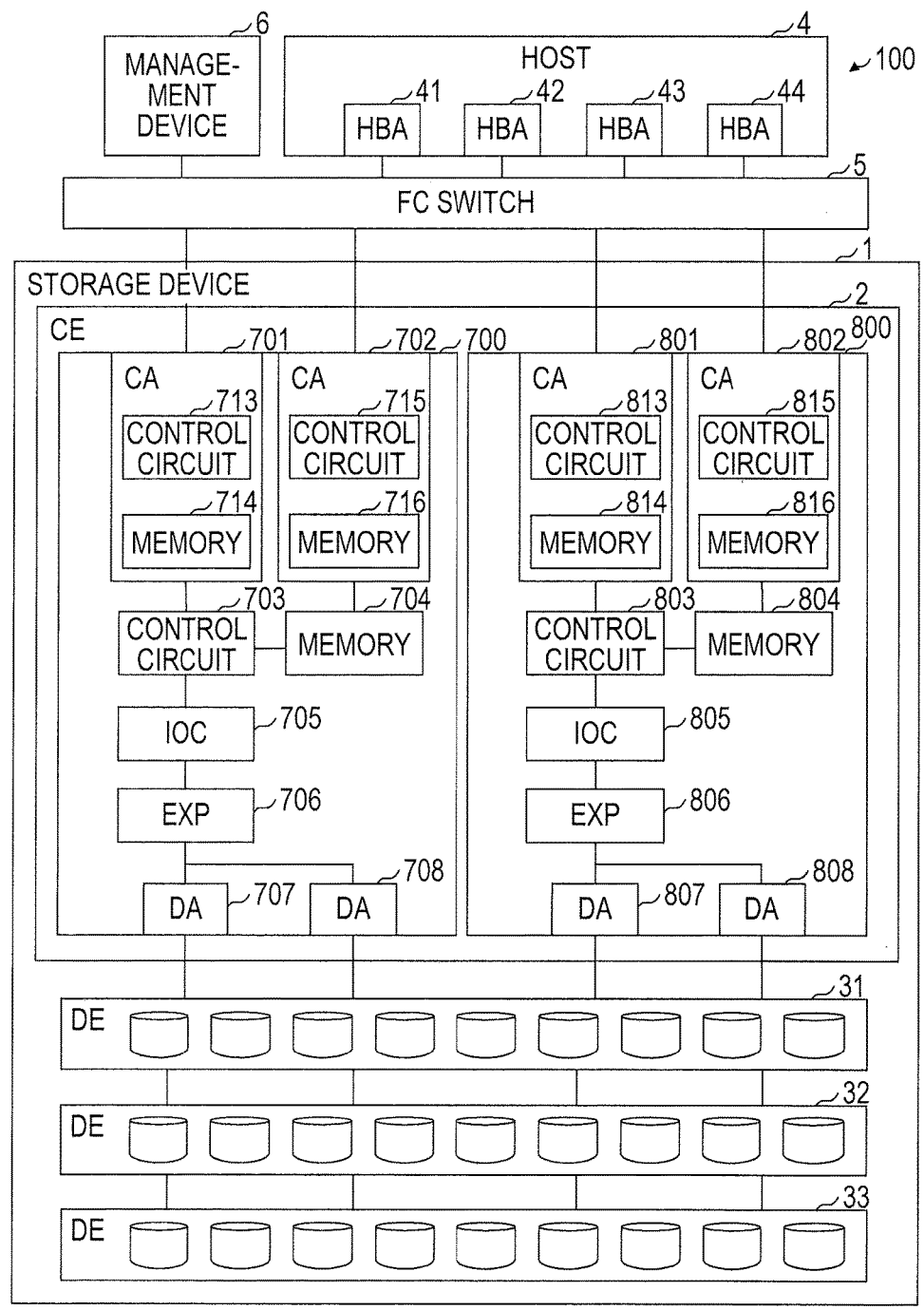
FIG. 12 is a diagram illustrating an exemplary configuration of a storage device.

FIG. 12 is a diagram illustrating an exemplary configuration of a storage device. The configuration of the storage device 1 will be described below with reference to FIG. 12.

The storage device 1 includes the CE 2 and the DEs 31 to 33. The CE 2 includes a control module (CM) 700 and a CM 800. The CM 700 serves as, for example, the controller 7 illustrated in FIG. 1. The CM 800 serves as, for example, the controller 8 illustrated in FIG. 1.

The CM 700 includes a CA 701, a CA 702, a control circuit 703, a memory 704, an IOC 705, an EXP 706 and DAs 707 and 708. These elements are interconnected by a bus (not illustrated). The CM 800 includes a CA 801, a CA 802, a control circuit 803, a memory 804, an IOC 805, an EXP 806 and DAs 807 and 808. These elements are interconnected by a bus (not illustrated). The CAs 701, 702, 801 and 802 serve as, for example, the data transceivers 71, 72, 81 and 82 illustrated in FIG. 1, respectively. In the following description, the controller 700 will be described and the controller 800 having a similar configuration to that of the controller 700 will not be described.

The CA 701 includes a control circuit 713 and a memory 714. The CA 702 has a similar configuration to that of CA 701 and, therefore, description thereof will be omitted.

The control circuit 713 is, for example, a processor such as a CPU, multicore CPU, a field programmable gate array (FPGA), or programmable logic device (PLD). The control circuit 713 serves as, for example, the communication control unit 711 illustrated in FIG. 1.

The memory 714 stores various data. The memory 714 includes, for example, a read-only memory (ROM) and a random access memory (RAM). The memory 714 serves as, for example, the holding unit 712 illustrated in FIG. 1.

A CA Firm that causes the control circuit 713 to act as the communication control unit 711 is written in the RAM of the memory 714 by the control circuit 703. In the storage device 1, the control circuit 713 executes the CA Firm written in the RAM so that the CA 701 performs the data exchange process.

The control circuit 703 controls the entire operation of the storage device 1. The control circuit 703 is a processor such as, for example, a CPU, a multicore CPU, an FPGA, or a PLD. The control circuit 703 serves as, for example, the control unit 73 illustrated in FIG. 1.

The memory 704 stores various data. The memory 704 includes, for example, memories such as a ROM and a RAM, and a hard disk (HD). The memory 704 serves as, for example, the storage unit 74 illustrated in FIG. 1.

The ROM stores programs such as a boot program and the like. The RAM is used as a work area of the control circuit 703. The HD stores programs such as, for example, an operating system (OS), application programs and firmware, and various data.

The memory 704 stores an update program of firmware to cause the control circuit 703 to act as the control unit 73.

When updating the CA Firm, the storage device 1 reads the update program of firmware stored in the memory 704 into the RAM. The control circuit 703 executes the update program of firmware read into the RAM so that the storage device 1 performs an updating process including one or more of an active exchanging process, a process of determination on possibility of automatic active exchange, and a path biasing process.

The firmware update program may be stored in a memory of a server on a network as long as the control circuit 703 may access the memory of the server via a communication interface (not illustrated).

The IOC 705 controls data exchange between the storage device 1 and disks included in the DEs 31 to 33, which is executed through, for example, the EXP 706 and the DAs 707 and 708.

Figure 13:
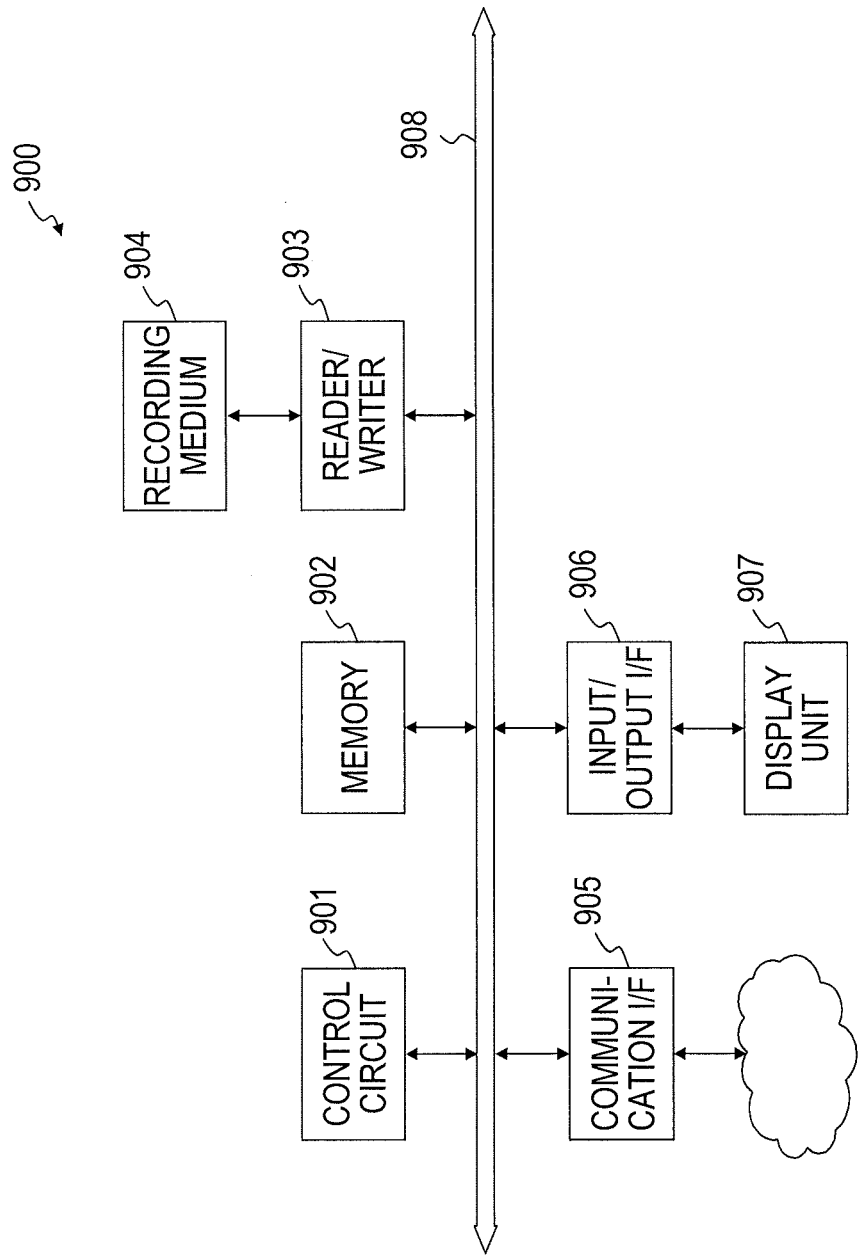
FIG. 13 is a diagram illustrating an exemplary configuration of a computer device.

FIG. 13 is a diagram illustrating an exemplary configuration of a computer device. The configuration of the computer device will be described below with reference to FIG. 13. A computer device 900 is an exemplary configuration of the host 4 and the management device 6 illustrated in FIG. 1.

As illustrated in FIG. 13, the computer device 900 includes a control circuit 901, a memory 902, a reader/writer 903, a communication interface (I/F) 905, an input/output interface (I/F) 906 and a display unit 907. These elements are interconnected by a bus 908.

The control circuit 901 controls the entire operation of the computer device 900. The control circuit 901 is a processor such as, for example, a CPU, a multicore CPU, an FPGA, or a PLD.

The memory 902 stores various data. The memory 902 includes, for example, memories such as a ROM and a RAM, and an HD.

The ROM stores programs such as, for example, a boot program. The RAM is used as a work area of the control circuit 901. The HD stores programs such as, for example, an OS, application programs and firmware, and various data.

The reader/writer 903 is controlled by the control circuit 901 to perform a read/write operation for data stored in a removable recording medium 904. The reader/writer 903 is, for example, a flexible disk drive (FDD), a compact disc drive (CDD), a digital versatile disk drive (DVDD), a Blu-ray® disk drive (BDD), or a universal serial bus (USB).

The recording medium 904 stores various data. The recording medium 904, for example, stores firmware update program.

The recording medium 904 is connected to the bus 908 via the reader/writer 903 and the reader/writer 903 performs a data read/write operation under control of the control circuit 901. Examples of the recording medium 904 may include a flexible disk (FD), a compact disc (CD), a digital versatile disk (DVD), a Blu-ray Disk® (BD), and a flash memory.

The communication I/F 905 communicably interconnects the computer device 900 and the storage device 1 via the switch 5 (FIG. 1).

When functioning as the management device 6, the computer device 900 may send the controller 700 the firmware update program read from the recording medium 904, in accordance with an instruction received from a user. Upon receiving the firmware update program from the computer device 900, the control circuit 703 may store the firmware update program in the memory 704.

The input/output I/F 906 is connected to input devices such as, for example, a keyboard, a mouse, and a touch panel. Upon receiving signals indicating a variety of information from the connected input devices, the input/output I/F 906 outputs the input signals to the control circuit 901 via the bus 908. Upon receiving signals indicating a variety of information from the control circuit 901 via the bus 908, the input/output I/F 906 outputs the signals to various devices connected thereto.

When the computer device 900 functions as the management device 6, the input/output I/F 906 may receive mapping information of a logical memory for the CAs 701, 702, 801 and 802, which is input by a user. The computer device 900 may send the received mapping information to the controller 700. Upon receiving the mapping information from the computer device 900, the control circuit 703 may store the mapping information in the memory 704.

The display unit 907, for example, is connected to the input/output I/F 906 and displays a variety of information.

As described above, the storage device 1 of the present embodiment stops the data exchange of a controller, in which a CA Firm is to be updated, by setting the state of a path connected to the controller to a non-recommended path under the multipath environment. Accordingly, since the storage device 1 may stop the data exchange of the controller, in which a CA Firm is to be updated, without relying on an administrator, the operation of the active exchange for the CA Firm may be simplified.

When receiving an RTPG (acquisition request) from a host in response to transmission of an AASC (change notification) to the host, the storage device 1 according to the present embodiment determines that the connected host supports the TPGS protocol, that is, the connected host has a path selection function. Accordingly, if the host does not support the TPGS protocol, the storage device 1 may avoid a useless process such as change of a path state in order to control the data exchange.

Upon receiving an I/O request (communication request) from the host when the path state is changed, the storage device 1 according to the present embodiment sends the path state to the host. Accordingly, the storage device 1 may cause, by setting the path state, the host to select a path to exchange data with the storage device 1.

When identification information of each logical memory built in the storage device 1 is assigned for each of the CAs included in two or more controllers, the storage device 1 according to the present embodiment determines that the storage device 1 and the host are interconnected under the multipath environment. Accordingly, the storage device 1 may avoid a useless process such as the CA Firm active exchange under the non-multipath environment. In addition, the storage device 1 may prevent errors from occurring due to a CA Firm active exchange process performed under the non-multipath environment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of updating firmware, the method comprising:
    changing by a computer, when all of logical memories included in a first logical memory group are included in a second logical memory group, recommendation levels of a first path and a second path such that a first recommendation level of the first path is lower than a second recommendation level of the second path if the first recommendation level is higher than or equal to the second recommendation level; and
    updating first firmware when no data is flowing through the first path,
    wherein
    the computer is included in a storage device,
    the storage device includes a first controller and a second controller,
    the first controller includes a first data transceiver connected to an upper level device through the first path,
    the first data transceiver includes a first processor configured to perform an access control of the first logical memory group by executing the first firmware,
    the second controller includes a second data transceiver connected to the upper level device through the second path, and
    the second data transceiver includes a second processor configured to perform an access control of the second logical memory group.

2. A storage device, comprising:
    a first controller including a first data transceiver connected to an upper level device through a first path, the first data transceiver including a first processor configured to perform an access control of a first logical memory group by executing first firmware;
    a second controller includes a second data transceiver connected to the upper level device through a second path, the second data transceiver including a second processor configured to perform an access control of a second logical memory group by executing second firmware; and
    a third hardware processor configured to
    change, when all of logical memories included in the first logical memory group are included in the second logical memory group, recommendation levels of the first path and the second path such that a first recommendation level of the first path is lower than a second recommendation level of the second path if the first recommendation level is higher than or equal to the second recommendation level, and
    update the first firmware when no data is flowing through the first path.

3. The storage device according to claim 2, wherein the first processor is configured to
    send, when updating the first firmware, a first change notification to the upper level device, the first change notification indicating that a first state of the first path is changed, and
    send, upon receiving a first acquisition request, the changed first recommendation level to the upper level device, the first acquisition request being transmitted from the upper level device in response to the first change notification and requesting acquisition of the changed first state, and the second processor is configured to
    send, when updating the first firmware, a second change notification to the upper level device, the second change notification indicating that a second state of the second path is changed, and
    send, upon receiving a second acquisition request, the changed second recommendation level to the upper level device, the second acquisition request being transmitted from the upper level device in response to the second change notification and requesting acquisition of the changed second state.

4. The storage device according to claim 2, wherein the first processor is configured to
    send, upon receiving data from the upper level device after the first recommendation level is changed, a first change notification to the upper level device, the first change notification indicating that a first state of the first path is changed, and
    the second processor is configured to
    send, upon receiving data from the upper level device after the second recommendation level is changed, a second change notification to the upper level device, the second change notification indicating that a second state of the second path is changed.

5. The storage device according to claim 2, further comprising:
    a storage unit configured to store therein first mapping information indicating the first logical memory group and second mapping information indicating the second logical memory group,
    wherein
    the third processor is configured to
    determine, based on the first mapping information and the second mapping information, whether all of the logical memories included in the first logical memory group are included in the second logical memory group.

6. The storage device according to claim 2, wherein the first controller further includes a third data transceiver connected to the upper level device through a third path, the third data transceiver including a fourth processor configured to perform an access control of a third logical memory group,
    the second controller further includes a fourth data transceiver connected to the upper level device through a fourth path, the fourth data transceiver including a fifth processor configured to perform an access control of a fourth logical memory group, and the third processor is configured to change, when all of logical memories included in at least one of the first logical memory group and the third logical memory group are included in at least one of the second logical memory group and the fourth logical memory group, recommendation levels of the respective paths such that the first recommendation level and a third recommendation level of the third path are lower than the second recommendation level and a fourth recommendation level of the fourth path if the first recommendation level and the third recommendation level are higher than or equal to the second recommendation level and the fourth recommendation level.

7. The storage device according to claim 2, wherein the third processor is configured to change after the first firmware is updated, when all of logical memories included in the second logical memory group are included in the first logical memory group, the first recommendation level and the second recommendation level such that the second recommendation level is lower than the first recommendation level, and update the second firmware when no data is flowing through the second path.

8. A hardware computer-readable recording medium having stored therein a program that causes a computer to execute a process, the process comprising:

changing, when all of logical memories included in a first logical memory group are included in a second logical memory group, recommendation levels of a first path and a second path such that a first recommendation level of the first path is lower than a second recommendation level of the second path if the first recommendation level is higher than or equal to the second recommendation level; and updating first firmware when no data is flowing through the first path, wherein the computer is included in a storage device, the storage device includes a first controller and a second controller, the first controller includes a first data transceiver connected to an upper level device through the first path, the first data transceiver includes a first processor configured to perform an access control of the first logical memory group by executing the first firmware, the second controller includes a second data transceiver connected to the upper level device through the second path, and the second data transceiver includes a second processor configured to perform an access control of the second logical memory group.

* * * * *